UNITED STATES PATENT OFFICE.

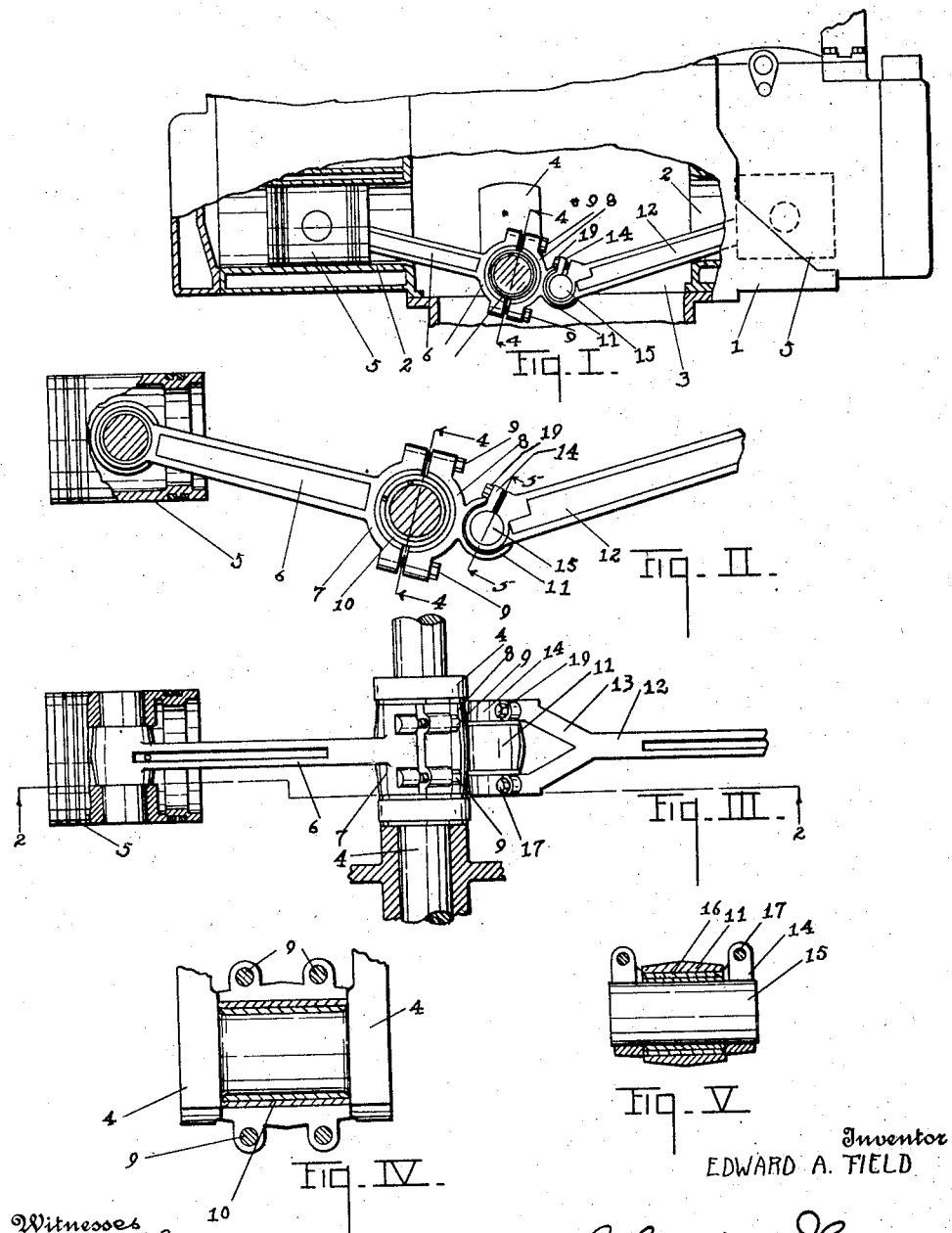

EDWARD A. FIELD, OF CHICAGO, ILLINOIS, ASSIGNOR OF ONE-HALF TO EDWARD A. FIELD, JR., OF CHICAGO, ILLINOIS.

CONNECTING-ROD ASSEMBLY.

1,329,389.  Specification of Letters Patent.  Patented Feb. 3, 1920.

Application filed April 21, 1919. Serial No. 291,427.

*To all whom it may concern:*

Be it known that I, EDWARD A. FIELD, a citizen of the United States, residing at Chicago, Illinois, have invented certain new and useful Improvements in Connecting-Rod Assembly, of which the following is a specification.

This invention relates to improvements in connecting rod assembly.

The main object of this invention is to provide in a multiple cylinder engine having opposed alined cylinders an improved piston rod structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail side elevation of a structure embodying the features of my invention, parts being broken away and parts being shown in section.

Fig. II is an enlarged detail partially in section on a line corresponding to line 2—2 of Fig. III.

Fig. III is a detail plan view of the parts shown in Fig. II, certain of the parts being shown in section.

Fig. IV is a detail section on a line corresponding to line 4—4 of Figs. I and II.

Fig. V is a detail section on a line corresponding to line 5—5 of Fig. II.

In the drawing similar reference characters refer to similar parts throughout the several views, and the sectional views are taken looking in the direction of the little arrows at the ends of the section lines.

Referring to the drawing, 1 represents the engine body generally of an internal combustion engine, it being provided with opposed alined cylinders 2 opening into the crank case 3. The crank shaft 4 is disposed between these cylinders. I only illustrate one pair of cylinders 2 and their pistons 5, but, in the structures manufactured for the market I have provided two pairs of these cylinders.

One of the pistons 5 is provided with a pitman or piston rod 6 provided with a crank bearing comprising a base section 7 formed on the end of the piston rod and a cap section 8 detachably secured thereto by means of the screws 9. The bearing is provided with a bushing 10.

The cap section 8 of the piston rod crank bearing is provided with a wrist pin bearing 11 disposed centrally thereon and in alinement with the piston rod 6, that is, it is directly opposite the piston rod 6.

The piston rod 12 for the other piston 5 is forked at 13 and provided with split clamping members 14 for the wrist pin 15 which is disposed through the bearing 11, a bushing 16 being provided for the bearing. The clamping members are clamped upon the ends of the wrist pin by means of the screws 17.

By this arrangement of parts the piston rods of the alined cylinders are connected to the crank in a manner for effectively delivering the power and at the same time the connection is simple, durable and effective, the parts being economical to produce and readily assembled and disassembled.

I have illustrated and described my improvements in one practical embodiment thereof. I have not attempted to illustrate or describe other embodiments or adaptations as I believe the disclosure made will enable those skilled in the art to which my invention relates to embody or adapt the same as may be desired.

Having thus described my invention, what I claim as new and desire to secure by Letters Patent, is:

1. In an internal combustion engine, the combination of a pair of opposed alined cylinders, a crank shaft disposed between said cylinders, pistons, a piston rod for one of said pistons having a crank bearing comprising a base section on said rod and a cap section detachably secured to the base section and carrying a centrally disposed wrist pin bearing, a wrist pin therefor, and a piston rod for the other piston forked at its ends to embrace said wrist pin bearing and receive said wrist pin at each side thereof and having split clamping members for said wrist pin.

2. In an internal combustion engine, the combination of a pair of opposed alined cylinders, a crank shaft disposed between said cylinders, pistons, a piston rod for one of said pistons having a crank bearing provided with a wrist pin bearing alined with the piston rod, a wrist pin therefor, and a piston rod for the other piston forked at its ends to embrace said wrist pin bearing and receive said wrist pin at each side thereof and having split clamping members for said wrist pin.

In witness whereof I have hereunto set my hand and seal in the presence of two witnesses.

EDWARD A. FIELD. [L. S.]

Witnesses:
 MARY E. MAHONEY,
 FRED W. JACKSON.